SIGNAL SEEKING RECEIVING APPARATUS

Filed July 24, 1961 2 Sheets-Sheet 1

WITNESSES:

Bernard R. Giegucy

James T. Young

INVENTORS

Robert Bento, Irving F. Barditch and Francis Rachal.

BY Ernest P. Klipfel

ATTORNEY

SIGNAL SEEKING RECEIVING APPARATUS

Filed July 24, 1961 2 Sheets-Sheet 2

United States Patent Office 3,189,829 Patented June 15, 1965

3,189,829
SIGNAL SEEKING RECEIVING APPARATUS
Robert Bento, Tiverton, R.I., and Irving F. Barditch and Francis Rachal, Baltimore, Md., assignors to Westinghouse Electric Corporation, East Pittsburgh, Pa., a corporation of Pennsylvania
Filed July 24, 1961, Ser. No. 126,242
5 Claims. (Cl. 325—470)

The present invention relates to signal seeking radio receiving apparatus, and more particularly to electronic signal seeking apparatus which requires no mechanically moving parts.

It is desirable in many applications to design electronic equipment having no mechanically moving parts. Presently available automatic signal seeking receiving apparatus generally use motor driven ganged capacitors in the seeking and tuning operation. The need for the motor and the mechanical drive brings the attendant problems of friction, weight, size, searching time and cost.

It is therefore an object of the present invention to provide a new and improved signal seeking receiving apparatus.

It is a further object of the present invention to provide a new and improved signal seeking apparatus which does not require use of mechanically moving parts.

Broadly, the present invention provides an all electronic automatic signal seeking radio receiving apparatus which scans a band of frequencies and stops scanning when incoming signals of sufficient amplitude are received. Seach means are provided which supply tuning signals to tunable receiving means, which are tuned in response to the tuning signals, to thereby scan across the band of frequencies. When an incoming signal is received of sufficient amplitude at the particular frequency to which the receiver is tuned at that time, switching means are activated to stop the searching means from supplying further tuning signals to the receiving means. When the switching means are activated, sensing means, whose outputs are substantially the same as the tuning signals at which the search operation stopped, are supplied to the receiving means to maintain the tuned frequency of the receiving means at the frequency that the incoming signals of sufficient strength were received.

These and other objects will become more apparent when considered in view of the following specification and drawings in which.

Figure 1:
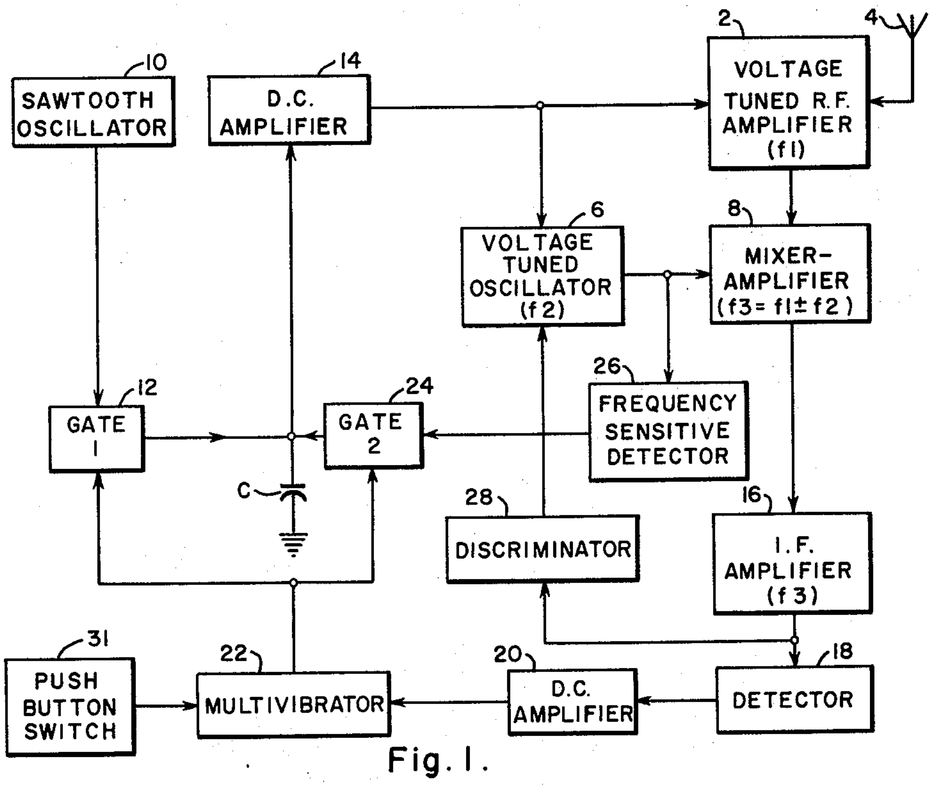
FIGURE 1 is a block diagram embodying the features of the present invention.

Referring to FIG. 1, the voltage tuned radio frequency (RF) amplifier 2 receives incoming signals over a band of frequencies through the antenna 4. The voltage tuned local oscillator 6 supplies mixing signals to the mixer amplifier 8, which also receives the amplified RF signals from the voltage tuned amplifier 2. In the mixer amplifier the RF signals are beat with the local oscillator signals to provide different output signals at an intermediate frequency. The amplifier 2 and the oscillator 6 are voltage tuned, that is, they are tuned to a frequency dependent upon the amplitude of the voltage applied thereto, as will be further explained below. The saw-tooth oscillator 10 provides an approximately linearly increasing voltage in time through the normally closed gate 12 to the D.C. amplifier 14, which in turn, provides tuning voltages to the voltage tuned amplifier 2 and the voltage tuned oscillator 6. The amplifier 2 and the oscillator 6 are designed so that the tuned frequency $f1$ of the amplifier 2 differs from the local oscillator frequency $f2$ by the intermediate frequency $f3$. As the sawtooth tuning voltage causes the voltage tuned amplifier 2 to search across a frequency band the local oscillator 6 follows in turn to provide a local frequency differing by the intermediate frequency. The intermediate frequency signals from the mixer-amplifier 8 are amplified in the intermediate frequency amplifier 16, which is tuned to the intermediate frequency $f3$. The amplified intermediate frequency signals from amplifier 16 are then detected in the detector 18 to provide a D.C. output to the D.C. amplifier 20.

As the voltage tuned amplifier 2 searches across the frequency band, if an incoming signal is received of sufficient amplitude at the frequency to which the amplifier 2 is tuned, and the incoming signal is of sufficient amplitude, the multivibrator 22 will change states to cause gate 12 to change from its conducting to non-conducting state, and thus stop the searching operation of the sawtooth oscillator 10. However, the gate 24 is switched to its conducting state when the gate 12 is switched off. The frequency sensitive detector 26 supplies an output voltage proportional to the local oscillator frequency. As the frequency of the local oscillator increases, the D.C. output of the frequency sensitive detector also increases. So, essentially the output voltage of frequency sensitive detector 26 follows the sawtooth voltage of the oscillator 10. At the time the gate 24 is rendered conductive the output of the frequency sensitive detector is applied to the D.C. amplifier 14 and there through to the voltage tuned amplifier 2 and to the voltage tuned local oscillator 6; thus maintaining the tuning voltage that had previously been applied by the sawtooth oscillator 10 immediately before the multivibrator 22 changed states. The capacitor C tends to maintain the voltage applied to the amplifier 2 and the oscillator 6 during switching operation. When the gates 12 and 24 change states, the receiver is then "locked on" to the incoming signal which is of sufficient amplitude to switch the multi-vibrator 22, and so the search operation is completed with the local oscillator 6 supplying the frequency sensitive detector 26 which in turn supplies the tuning voltages required by the voltage tuned amplifier 2 and the voltage tuned oscillator 6 to remain tuned to the frequency of the incoming signal.

For fine tuning of the receiver to the incoming signal the discriminator 28 is connected between the intermediate frequency amplifier 16 and the voltage tuned oscillator 6, with the discriminator 28 being tuned to the intermediate frequency $f3$. Therefore, if the intermediate frequency should deviate from $f3$, a correcting signal will be applied to the voltage tuned oscillator 6 to change the local oscillator frequency slightly to readjust to the desired intermediate frequency $f3$. The discriminator 28 supplies, for example, a positive voltage if the intermediate frequency is too low and a negative voltage if the intermediate frequency exceeds the desired intermediate frequency.

In order to restart the searching operation a push button switch 31 is provided to reset the bistable multivibrator 22 to its original state so that the gate 12 will be in its conducting state and gate 24 in its non-conducting state. The sawtooth oscillator 10 then may again apply sawtooth tuning voltages to the voltage tuned amplifier 2 and the voltage tuned oscillator 6, causing the receiver to continue to search for incoming signals within the frequency band that are of sufficient amplitude to again switch the multivibrator 22.

Figure 2:
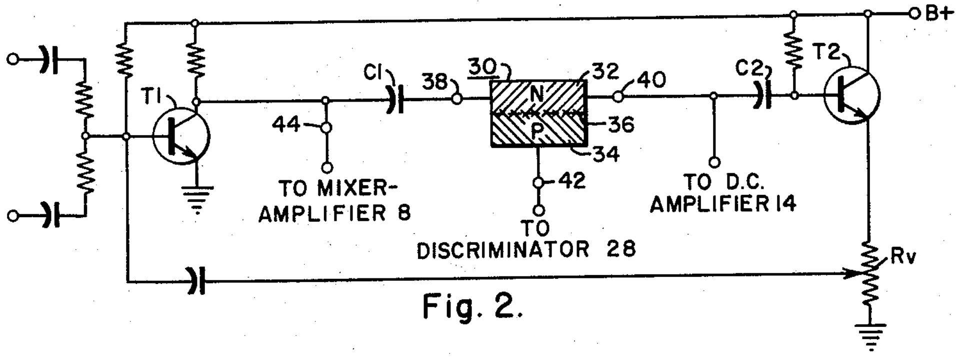
FIG. 2 is a schematic diagram of a voltage tuned amplifier as utilized in the present invention.

Broadband electronic tuning is used in both the voltage tuned RF amplifier 2 and the voltage tuned local oscillator 6, and may be used for the mixer-amplifier 8 and the intermediate frequency amplifier 16. In FIG. 2 is shown a voltage tuned amplifier with the input terminal connections necessary to function as the voltage tuned oscillator 6; however, it should be noted that with slight modifications the same circuitry may be utilized for the voltage tuned amplifier 2, the mixer-amplifier 8 and the IF amplifier 16.

Figure 3:
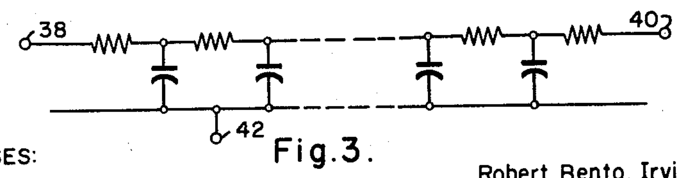
FIG. 3 is an equivalent circuit of a semi-conductor device as utilized in the present invention.

The semiconductor device 30 shown in FIG. 2 has a region 32 of n-type semiconductivity and a region 34 of p-type semiconductivity with a p-n junction 36 therebetween. An equivalent circuit of the semiconductor device 30 when the p-n junction is reverse biased is shown in FIG. 3. Between the terminals 38 and 40 are the incremental resistors $r$ and between the incremental resistors $r$ and the terminal 42 appear the incremental capacitors $c$ whose value change in proportion to the reverse bias applied across the p-n junction 36. Thus, by controlling the reverse bias applied to the p-n junction 36 the transfer characteristics between the terminals 38 and 40 of the semiconductor device 30 may be changed, so that the device acts as a phase shift filter. Device 30 acting as a phase shift filter then may be utilized to controllably tune an amplifier, and by controlling the gain of the amplifier and their phase relationships in the feedback loop an oscillator may be obtained.

In FIG. 2, the transistor T1 has its collector connected through the coupling capacitor C1 to drive the semiconductor device 30 with the reverse biased p-n junction 36 acting as a voltage control distributed R-C phase shift network. From terminal 40 of the semiconductor device 30, the phase shifted signals are applied through the coupling capacitor C2 to the base of the transistor T2 wherein the signals are amplified, and then coupled back into the input of the transistor T1. The magnitude of the feedback is determined by the setting on the potentiometer R$v$. The feedback signals from the transistor T2 affect the circuit according to the phase relationship that might exist with any input signal that could be applied to the base of the transistor T1. When any incoming signal and the feedback signal are in phase, the gain of the amplifier will be a maximum. If the frequency is greater or less for the in phase case the gain will be correspondingly decreased, therefore providing tuning about the in phase frequency. In order to tune to other frequencies the back bias on the p-n junction may be changed through applying voltages of either polarity to terminals 40 or 42 as shown in FIG. 2 for the voltage tuned oscillator 6. If a sweep voltage, such as a sawtooth wave form, is applied to the p-n junction the circuit will then progressively tune through a band of frequencies. In the particular case when oscillations are desired as for the voltage tuned local oscillator 6, the gain of the transistor must set a sufficiently high level to sustain oscillations over a wide range of sweep voltages applied to reverse bias the p-n junction.

In FIG. 2, the tuning voltage from the sawtooth oscillator 10 is applied through the gate 12 and the DC amplifier 14 to the terminal 40 which causes the reverse bias across the p-n junction 36 to be progressively changed thus tuning the oscillator 6 to various oscillating frequencies, which are seen at the output terminal 44, with the output local frequency signal being applied to the mixer-amplifier 8 and also to the frequency sensitive detector 26. The terminal 42 is supplied with the output voltage from the discriminator 28 to fine tune the oscillator by adjusting the reverse bias voltage when the intermediate frequency $f3$ deviates from said frequency. The circuitry as shown in FIG. 2 may be utilized for the voltage tuned RF amplifier 2 by the same configuration, however, applying the sweep voltage from the sawtooth oscillator 10 to either the terminals 38, 40 or 42. To provide an intermediate frequency amplifier, the p-n junction is set at a fixed bias to provide a tuned amplifier at the frequency $f3$ and the input from the mixer-amplifier 8 being applied to the base of the transistor T1. To provide the mixer-amplifier 8, a fixed reverse bias is supplied to the p-n junction, and two separate inputs are applied to the base of the transistor T1 through coupling capacitors and suitable limiting resistors.

Figure 4:
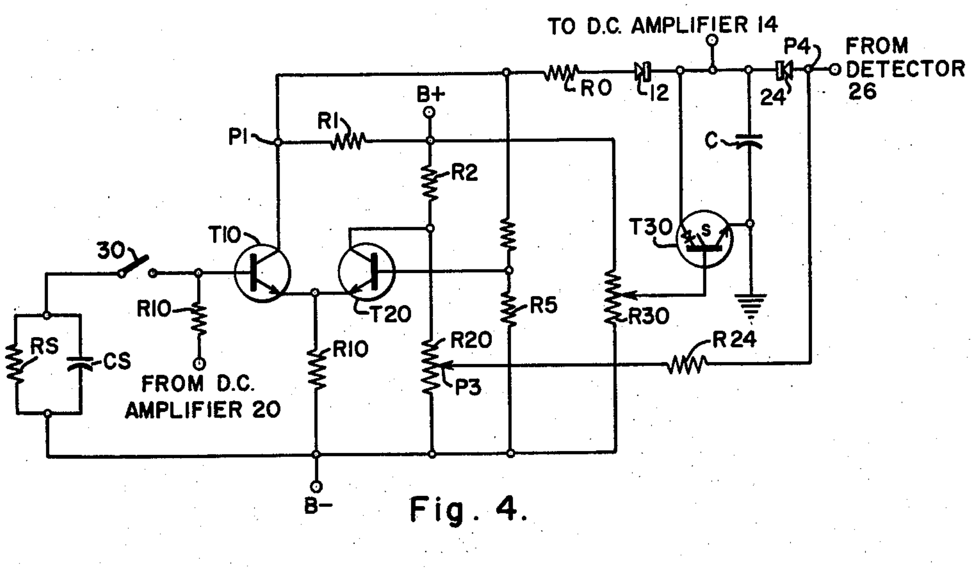
FIG. 4 is a schematic diagram of the circuitry enclosed within the dotted box of FIG. 1.

Now referring to FIG. 4, the circuitry for the sawtooth oscillator 10, the multivibrator 22, the gates 12 and 24 and the push button switch 31 is shown. The multivibrator 22 comprises transistors T10 and T20, with the transistor T10 being in its high impedance non-conducting state during the search operation and the transistor T20 being in its low impedance conducting state during this operation. Because the point P1 at the collector of the transistor T10 is positive with respect to ground the gate diode 12 is forward biased and permits the capacitor C to charge in a sawtooth manner; a charging path being provided from B+, through the resistors R1 and R2, and the gate 12. The capacitor C is discharged through the silicon controlled rectifier T30, which has its gate terminal biased by the potentiometer R30 connected between B+ and B−. When a large enough input is provided by the D.C. amplifier 20 through the resistor R10 to the base of the transistor T10, it is changed to its conducting state and transistor T20 is changed to its non-conducting state. This causes point P1 to be essentially grounded, thus back biasing the diode gate 12 and rendering it non-conductive. Since the transistor T20 is now non-conductive, its collector becomes positive at point P2. The voltage developed across the resistor R20 from the tap at point P3 is applied through the resistor R24 to the anode at P4 of the gate diode 24 which is then biased in its forward direction and so permits the voltage input from the frequency sensitive detector 26 to be passed therethrough to the D.C. amplifier 14. When the push button switch 31 is closed transistor T10 is returned to its non-conducting state so that the sweep operation may again begin and continue until a sufficient strength incoming signal is again received.

Figure 5:
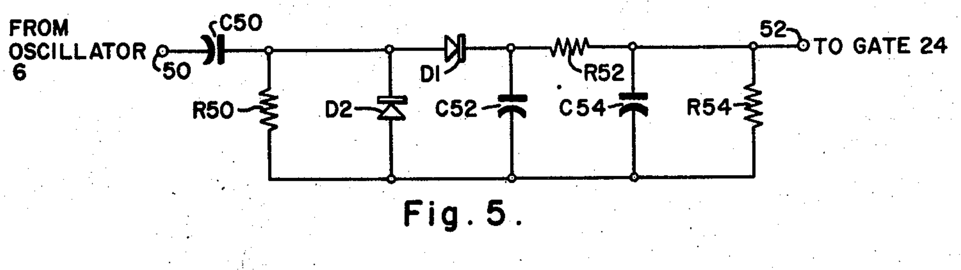
FIG. 5 is a schematic diagram of a frequency sensing detector as utilized in the present invention.
Figure 6:
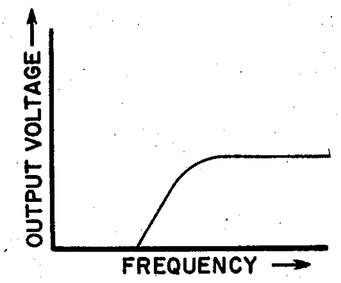
FIG. 6 is a plot of the output voltage of the detector of FIG. 5 as a function of frequency.

FIG. 5 shows a frequency sensitive circuit which may be utilized for the frequency sensitive detector 26. The local oscillator 6 input is applied to the terminal 50 and the D.C. output of the frequency sensitive detector 26 is taken from terminal 52 to be applied to the gate 24 and in turn to the voltage tuned amplifier 2 and the voltage tuned oscillator 6. The RC combination of the resistor R50 and the capacitor C50 act as a high pass filter so as the frequency increases the D.C. output at terminal 52 increases. The diodes D1 and D2 provide for rectification, and capacitors C52 and C54 and resistors R52 and R54 are so designed so that the output of the frequency sensing detector 26 closely follows the waveform of the sawtooth oscillator 10. The output voltage of the detector 26 as a function of frequency is shown in FIG. 6. Thus with the output of the frequency sensitive detector 26 following the sawtooth output, when the search operation is stopped by an incoming signal of sufficient amplitude received at the antenna 4, the local oscillator 6 and the voltage tuned amplifier 2 will be "locked on" to this incoming signal because the frequency sensitive detector 26 provides substantially the same voltage to maintain the tuned frequency of both the voltage tuned RF amplifier 2 and the voltage tuned local oscillator 6.

Although the present invention has been described with a certain degree of particularity, it should be understood that the present disclosure has been made only by way of example and that numerous changes in the details of the circuitry and the combination and arrangement of elements may be resorted to without departing from the scope and spirit of the present invention.

We claim as our invention:

1. In signal seeking receiving apparatus the combination of: search means operative to provide tuning signals; receiving means including tunable amplifying means operative to receive incoming signals and being tunable within a band of frequencies in response to said tuning signals, a tunable oscillator responsive to said tuning signals to provide local signals at a predetermined frequency with respect to the tuned frequency of said amplifying means, and mixing means operatively connected to said amplifying means and said oscillator to provide beat frequency signals; switching means operative to stop said search means from providing tuning signals to said amplifying means and said oscillator when said receiving means provides an output signal above a predetermined amplitude; frequency sensing means operative to provide substantially the same tuning signals to said amplifying means and said oscillator as said search means when said search means is stopped so that the respective tuned frequencies of said amplifying means and said oscillator are maintained; and discriminator means tuned to said intermediate frequency connected between said mixer means and said oscillator to provide fine tuning signal voltages to said oscillator in response to deviation of said local oscillator from said intermediate frequency.

2. In signal seeking receiving apparatus the combination of: search means operative to provide variable tuning voltages; voltage tunable amplifying means operative to receive incoming signals and being tunable within a band of frequencies in response to said tuning voltages; a voltage tunable oscillator responsive to said tuning voltage to provide local signals at a predetermined frequency with respect to the tuned frequency of said amplifying means; mixing means operatively connected to said amplifying means and said oscillator to provide intermediate frequency signals; a detector operatively connected to said mixing means to provide detected output signals; switching means operative to stop said search means from providing tuning voltages to said amplifying means and said oscillator when said detector provides output signals above a predetermined amplitude; frequency sensing means operative to provide substantially the same tuning voltage to said amplifying means and said oscillator as said search means when said search means is stopped so that the respective tuned frequencies of said amplifying means and said oscillator are maintained; discriminator means operatively connected between said mixer means and said oscillator and tuned to said intermediate frequency to provide a fine tuning voltage to said oscillator in proportion to the deviation of said intermediate signals; and reset means operative to restart said search means.

3. In a signal seeking receiving apparatus the combination of: a source of sweep tuning signals; receiving means including tunable amplifying means to receive incoming signals and being tunable within a band of frequencies in response to said tuning signals; a tunable oscillator also responsive to said tuning signals to provide heterodyning signals spaced by a selected frequency interval from the tuned frequency of said amplifying means; mixer-amplifier means connected to said receiving means and to said local oscillator to provide beat frequency signals; switching means responsive to the output of said receiving means for stopping said search means from providing tuning signals to said receiving means when said receiving means provides output signals above a predetermined amplitude; sensing means operative to provide tuning signals of substantially the same amplitude as the tuning signals provided by said sweep tuning signals at the instant said switch means was stopped; and discriminator means tuned to said intermediate frequency and connected between said mixer amplifier means and said oscillator to provide fine tuning signal voltages to said oscillator in response to deviation of said local oscillator from said intermediate frequency.

4. Signal seeking receiver apparatus comprising a source of sweep tuning signals, receiving means including tunable amplifying means to receive incoming signals and being tunable within a band of frequencies in response to said signals; a tunable oscillator also responsive to said tuning signals to provide local oscillator signals spaced by a selected frequency interval from the tuned frequency of said amplifying means, mixer-amplifier means connected to said receiving means and to said local oscillator to provide beat frequency signals; switching means responsive to the output of said receiving means for rendering said search means inoperative to provide tuning signals to said receiving means when said receiving means provides output signals above a predetermined amplitude and means responsive to the output of said mixer-amplifier means for providing fine tuning adjustment to said oscillator to hold it to the frequency at which it was operating at the instant said sweep tuning means were rendered inoperative.

5. Signal seeking apparatus comprising a source of sweep tuning signals, receiving means including tunable amplifying means to receive incoming signals and being tunable within a band of frequencies in response to said tuning signals, a tunable oscillator responsive to said tuning signals to provide local heterodyning signals at a selected frequency with respect to the tuned frequency of said receiver means, mixer means operatively connected to said receiver means and said oscillator to provide a heterodyne frequency, automatic switching means responsive to the output of said receiving means for operatively disassociating said tuning signals from said receiving means for stopping the sweep tuning of said receiving means when the output of said receiving means is above a predetermined amplitude, means responsive to the output of said receiving means for providing fine tuning signal voltages to said oscillator in response to deviation of said local oscillator from said heterodyne frequency and means responsive to the output of said local oscillator for providing substantially the same tuning signals to said amplifying means and to said local oscillator as was provided by said sweep tuning means when said sweep tuning means was rendered inoperative.

References Cited by the Examiner

UNITED STATES PATENTS

| | | | |
|---|---|---|---|
| 2,601,384 | 6/52 | Goodrich | 325—470 |
| 2,977,465 | 3/61 | Sanders | 325—332 |
| 2,977,467 | 3/61 | Black | 325—469 |
| 2,979,614 | 4/61 | Woodworth | 325—423 |
| 3,041,451 | 6/62 | Laing | 325—470 |

DAVID G. REDINBAUGH, *Primary Examiner.*

ROY LAKE, *Examiner.*